United States Patent [19]

Yamamoto et al.

[11] 4,399,472

[45] Aug. 16, 1983

[54] PHASE DIFFERENCE COMPENSATION BETWEEN SEPARATELY RECORDED LUMINANCE AND CHROMINANCE SIGNALS

[75] Inventors: Katsuhiko Yamamoto, Neyagawa; Chojuro Yamamitsu, Kawanishi; Kunio Sekimoto, Katano; Kozo Kurashina, Yawata, all of Japan

[73] Assignee: Matsushita Electric Industrial Company, Limited, Osaka, Japan

[21] Appl. No.: 272,372

[22] Filed: Jun. 10, 1981

[30] Foreign Application Priority Data

Jun. 11, 1980 [JP] Japan .................................. 55-79549
Jul. 17, 1980 [JP] Japan .................................. 55-98388

[51] Int. Cl.³ ...................... H04N 9/44; H04N 9/491
[52] U.S. Cl. ..................................... 358/320; 358/330
[58] Field of Search ............... 358/320, 323, 327, 330, 358/337; 360/36.1

[56] References Cited

U.S. PATENT DOCUMENTS

| | | | |
|---|---|---|---|
| 3,409,736 | 11/1968 | Hurst et al. | 360/36.1 |
| 3,534,169 | 10/1970 | Bockwoldt | 358/320 X |
| 3,560,634 | 2/1971 | Diller et al. | 358/337 X |
| 4,005,473 | 1/1977 | Hjortzberg | 358/320 |
| 4,052,740 | 10/1977 | Coleman, Jr. | 358/330 X |
| 4,074,307 | 2/1978 | Dischert et al. | 358/337 X |
| 4,291,344 | 9/1981 | Kimura | 360/36.1 |

*Primary Examiner*—Aristotelis M. Psitos
*Attorney, Agent, or Firm*—Lowe, King, Price & Becker

[57] ABSTRACT

Luminance and chrominance signals, which are interleaved with respective synchronization signals, are recorded through the use of two video transducer heads alternately in skewed separate tracks of a recording tape. Upon reproduction, the timing signals are separated from the luminance and chrominance signals and compared in phase between them to detect the phase difference between the luminance and chrominance signals. A variable delay line is provided to introduce a variable delay interval as a function of the detected phase difference to the one of the signals which is advanced in phase relative to the other. The time axis deviation of the video signal from a standard phase is also detected by a comparison between the time base, or horizontal sync pulse, and a reference time base to introduce a delay time to both the luminance and chrominance signals.

11 Claims, 8 Drawing Figures

PHASE DIFFERENCE COMPENSATION BETWEEN SEPARATELY RECORDED LUMINANCE AND CHROMINANCE SIGNALS

BACKGROUND OF THE INVENTION

The present invention relates generally to phase difference compensation, and in particular to a color video tape recording and reproducing system which includes a phase difference corrector for eliminating the phase difference between luminance and chrominance signals reproduced from separately recorded tracks.

In conventional video tape recorders, luminance and chrominance signals are frequency-division multiplexed and recorded in a common track. The signals recorded by this method tend to be contaminated by the noise which arises from intermodulation products, resulting in a poor signal-to-noise ratio, and therefore, a variety of deviations in hue and color saturation. This is particularly disadvantageous for portable video tape recorders for use in television broadcasting stations where high standard picture quality is required for videotaped materials which are repeatedly transferred or "dubbed" from tape to tape for editing purposes.

Furthermore, since cassette tapes of portable video tape recorders must operate under different environmental conditions, they tend to have a different physical characteristic when the material, which is videotaped outdoors, is reproduced by an indoor equipment. This results in a deviation of the time base from the standard timing.

SUMMARY OF THE INVENTION

The present invention obviates these problems by the use of at least two video transducer heads for recording luminance and chrominance signals alternately in separate tracks to eliminate the intermodulation noise.

However, the transducer heads must be located to within a manufacturing tolerance of as low as 0.12 micrometers in the case of VHS type video tape recorders in order to keep the phase difference error to a satisfactory value of 30 nanoseconds. Thus, it is extremely difficult to keep the transducer heads in the correct positions.

Furthermore, reproduced luminance and chrominance signals must be passed through circuits having different bandwidths and as a result one of the signals experiences a larger amount of delay than the other.

The video tape recording and reproducing system of the invention contemplates to detect the phase difference between the reproduced luminance and chrominance signals and to introduce a variable delay interval as a function of the detected phase difference into one of the signals relative to the other to provide phase alignment between them.

Preferably, the phase difference is detected by comparison of timing signals each interleaved with the luminance and chrominance signals during vertical blanking interval since it allows a sufficient amount of safety margin for separating the timing signals from the respective luminance and chrominance signals.

More specifically, the color video tape recording and reproducing system of the present invention comprises first and second video transducer heads mounted on a rotary cylinder for recording luminance and chrominance signals alternately in separate tracks which are skewed to the length of a recording tape. A first phase comparator detects the difference in phase between reproduced luminance and chrominane signals. Variable delay means is provided to introduce a variable delay interval to one of the luminance and chrominance signals as a function of the detected phase difference to provide phase alignment between the two signals. A second phase comparator provides phase comparison of the time base of either the luminance or chrominance signal with a reference time base. The phase difference derived from the second phase comparator is used to control the variable delay means to eliminate time base errors.

The present invention is therefore to provide a color video tape recording and reproducing system which is particularly suitable for small-sized portable video cameras and which assures high quality image reproduction even when videotaped material is transferred from tape to tape for editing purposes.

BRIEF DESCRIPTION OF THE DRAWINGS

The invention will be further described by way of example with reference to the accompanying drawings, in which.

DETAILED DESCRIPTION

Figure 1:
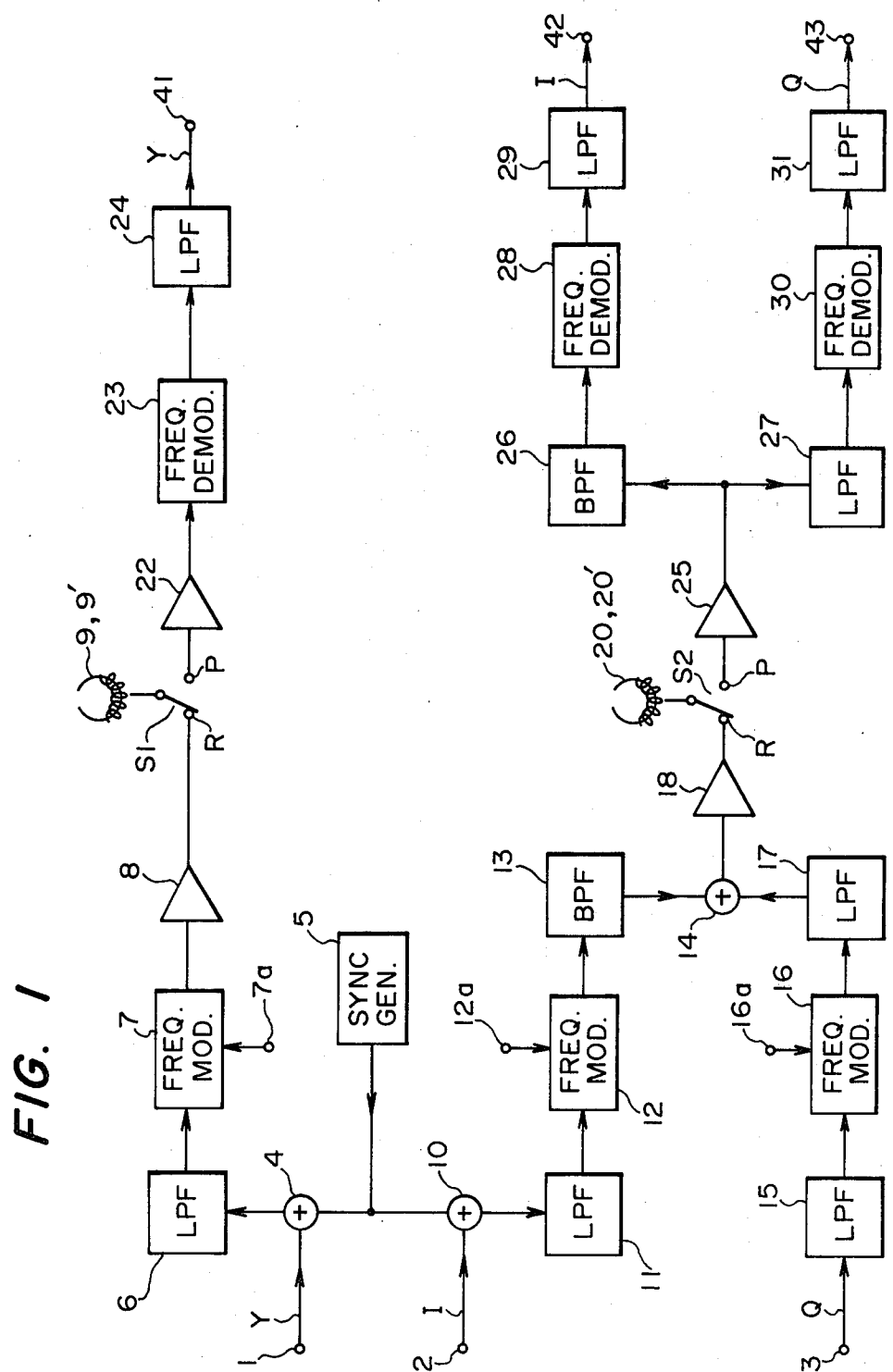
FIG. 1 is an illustration of a block diagram of a part of the vide recording and reproducing system of the invention.

Referring now to FIG. 1, a video tape recording and reproducing system of a first embodiment of the invention is illustrated in a schematic diagram. The system is adapted to receive video signals including a luminance or Y signal, and color difference signals R-Y and B-Y, or I and Q signals, respectively, at input terminals 1, 2 and 3 from a color video camera, not shown. The luminance signal at input terminal 1 is combined with vertical and horizontal sync pulses in an adder 4 supplied from a sync generator 5 which is synchronized with the deflection system of the video camera. The sync pulses may, of course, be supplied direct from the deflection system of the video camera. The sync-inserted luminance signal is fed to a low-pass filter 6 where the input signal is limited in frequency to a bandwidth of 4 MHz, for example, and thence to a frequency modulator 7 to frequency modulate a carrier supplied to a terminal 7a so that the modulated luminance signal has a maximum frequency shift of from 4.4 MHz to 6.0 MHz. Although not shown in FIG. 1 for simplicity, the bandwidth-limited luminance signal from the low-pass filter 6 is processed prior to application to the frequency modulator 7 through a number of stages including a clamping circuit, a preemphasis circuit which emphasizes the higher frequency component of the signal and a clipping circuit that clips the signal to a level corresponding to the highest recording frequency of the video tape recorder. After being amplified at 8, the frequency-modulated luminance signal is applied through a recording-mode termimal R of a manually operated switch S1 alternately to video transducer heads 9, 9'.

The I signal, applied to terminal 2, is combined with the sync pulses in an adder 10 and fed to a low-pass filter 11 where the I signal is limited in frequency to a bandwidth of 1 MHz, for example. In a manner similar to the luminance signal, the I signal is passed through a number of processing circuits including clamping, preemphasis and clipping circuits, not shown, to a frequency modulator 12 to frequency modulate a carrier fed to a terminal 12 so that the modulated I signal has a maximum frequency shift of from 5 MHz to 6 MHz. The frequency-modulated I signal is limited in frequency by a band-pass filter 13 to a bandwidth of from about 3 MHz to 8 MHz and presented to a first input of an adder 14.

The video signals applied to terminals 1 and 2 could also be derived from a conventional television receiver. In this case, the luminance signal at terminal 1 is directly applied to the low-pass filter 6 since the sync pulses have been inserted in the luminance signal and the I signal may be combined with timing pulses which occur during each vertical blanking interval.

The Q signal, applied to terminal 3 on the other hand, is limited in frequency by a low-pass filter 15 to a bandwidth of 0.5 MHz, for example, and is processed through a number of stages including clamping, preemphasis and clipping circuits as mentioned above, and fed to a frequency modulator 15 where a carrier at terminal 16a is modulated by the Q signal so that the modulated output has a maximum frequency shift of from 0.7 MHz to 1.25 MHz. The frequency-modulated Q signal is then limited in frequency by a low-pass filter 17 to a bandwidth of up to about 2 MHz and presented to a second input of the adder 14 and frequency-division multiplexed in the adder 14 with the I signal. The output of the adder 14 is amplified at 18 and and supplied through a recording-mode terminal R of a manually operated switch S2 alternately to video transducer heads 20, 20'.

Figure 2A:
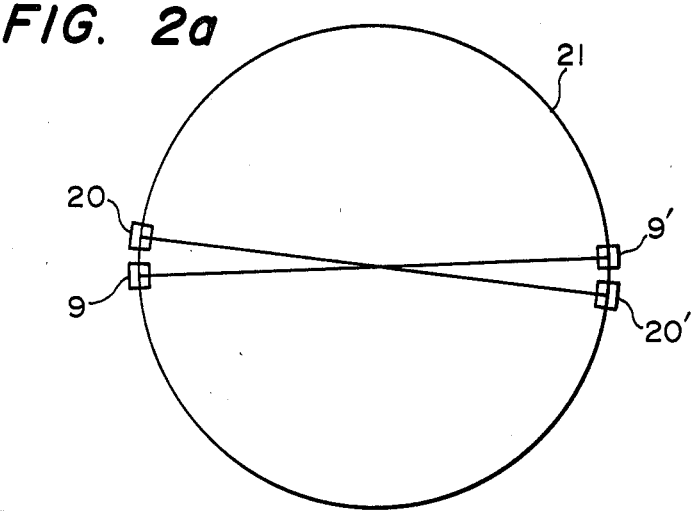
FIGS. 2a and 2b are schematic illustrations of video transducer heads shown respectively in plan and elevational views.
Figure 2B:
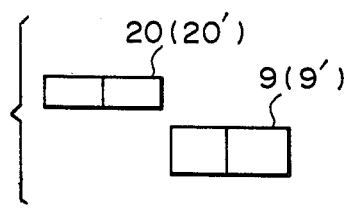
Figure 3A:
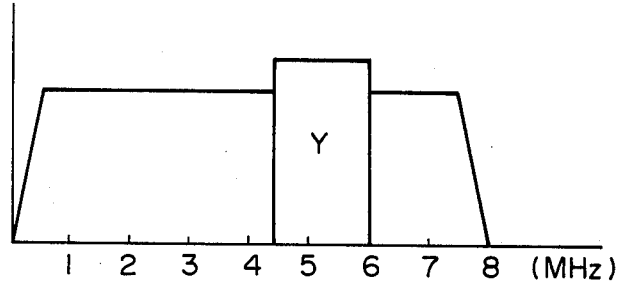
FIGS. 3a and 3b graphic illustrations of the spectrums of recorded luminance and chrominance signals, respectively.
Figure 3B:
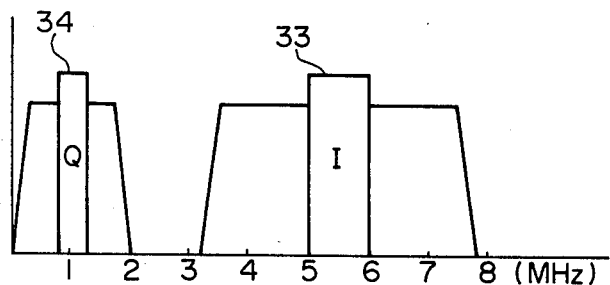

Details of the video transducer heads 9, 9' and 20, 20' are shown in FIGS. 2a and 2b. The video heads 9 and 9' are mounted in pair on the outer wall of a rotary cylinder 21 in diametrically opposite positions at equal vertical positions. Similarly, the video heads 20 and 20' are mounted in pair on the outer wall of the cylinder 21 in diametrically opposite positions at equal vertical positions so that the heads 20 and 20' are angularly and vertically spaced from the heads 9 and 9', respectively, as shown in FIG. 2b. The luminance and chrominance signals are thus separately recorded in alternately occurring tracks which are skewed to the length of the tape. The frequency spectrums of the recorded Y signal and the frequency-division multiplexed I and Q signals are shown in FIGS. 3a and 3b.

If the system of the invention is used in a portable video tape recorder (particularly for broadcasting applications), this video tape recorder is provided with the recording circuit mentioned above and the videotaped cassettes recorded in a manner described above are put on a video recording-reproducing system incorporating a playback circuit which will be described hereinbelow.

When the system is operated in the playback mode with the switches S1 and S2 being switched to playback-mode terminals P, the recorded luminance signal is detected alternately by the video heads 9, 9' and through a preamplifier 22 applied to a limiter, not shown, to remove voltage fluctuations that arise from tape-to-head contact variations and thence to a frequency demodulator 23. The frequency demodulated luminance signal is passed to a low-pass filter 24 having a cutoff frequency of about 4 MHz and presents the original baseband luminance signal to an output terminal 4.

The frequency-division multiplexed I and Q signals are also detected alternately by video heads 20, 20' and through a preamplifier 25 applied to a band-pass filter 26 and also to a low-pass filter 27 in order to separate the I and Q signals. The separated I and Q signals are respectively passed through limiter circuits, not shown, to eliminate voltage fluctuations in a manner as mentioned above and fed to frequency demodulators 28 and 30 and thence to low-pass filters 29 and 30, respectively, so that the baseband I and Q signals appear at output terminals 42 and 43. The baseband video signals obtained at the terminals 41, 42 and 43 are connected to the corresponding terminals of a later stage of the playback circuit which is shown in FIGS. 4a and 4b in separate sheets.

Figure 4A:
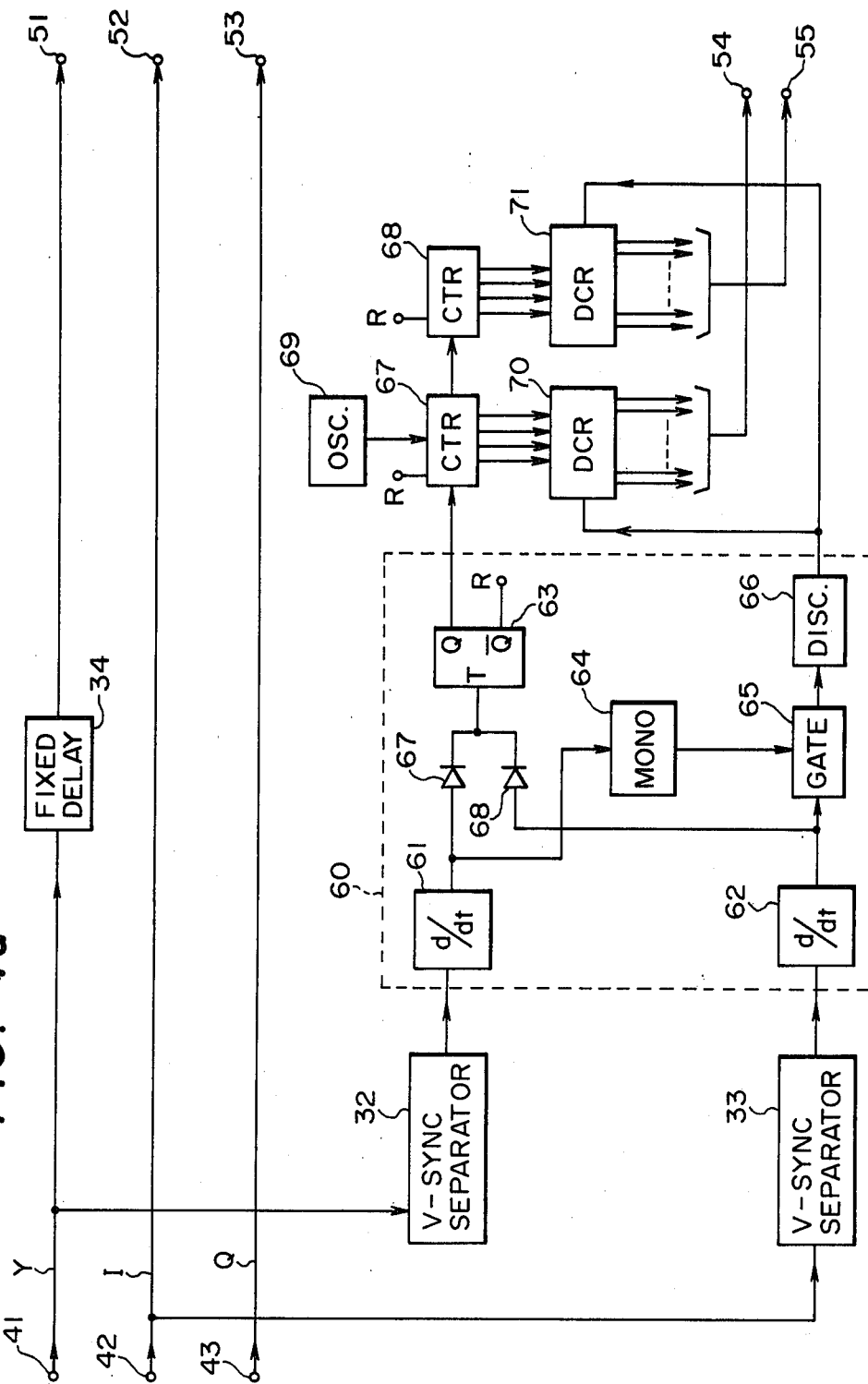
FIGS. 4a and 4b are illustration of a block diagram showing part of the system in accordance with a first embodiment of the invention.
Figure 4B:
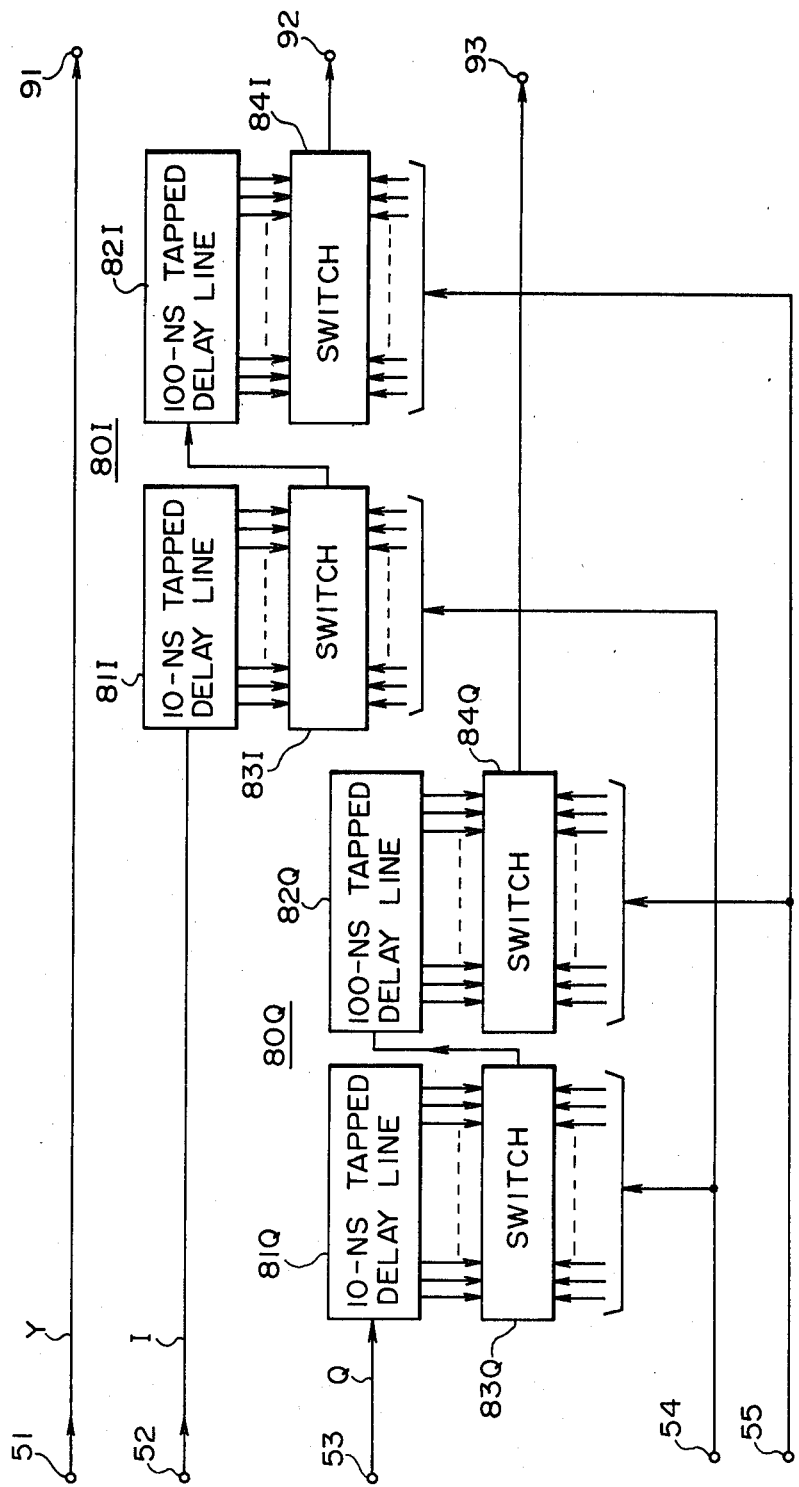

In FIG. 4a, the luminance signal at terminal 41 is applied to a vertical sync separator 32 to extract a vertical sync pulse which is fed to a differentiator circuit 61 of a phase comparator 60 to detect the leading edge of the vertical sync pulse thus separated from the luminance signal. The luminance signal at terminal 41 is also presented to a fixed delay line 34 which introduces a delay time approximately half the maximum delay interval correctable by the system, the delayed luminance signal being coupled to a luminance output terminal 51.

The baseband I signal at terminal 42 is, on the other hand, applied to a vertical sync separator 33 to separate a vertical sync pulse from the I signal which is coupled to a differentiator circuit 62 of the phase comparator 60 to detect the leading edge of the vertical sync pulse separated from the I signal. The phase comparator 60 further includes a T flip-flop 63 which takes its trigger input via diodes 67 and 68 from the differentiators 61 and 62. The flip-flop 63 is triggered into a set condition in response to the detected leading edge of the separated vertical sync pulse which is advanced with respect to the other and is switched to a reset condition in response to the detected leading edge of the other vertical sync pulse. The Q output of the flip-flop 63 is applied as an enabling signal to a counter 67 so that the latter remains enabled for a period exactly corresponding to the phase difference between the luminance and chrominance signals regardless of which signal is advanced with respect to the other. The output of the differentiator 61 is also coupled to a monostable multivibrator 64 to generate a window pulse in response to the detected leading edge of the vertical sync pulse. The period of the monostable multivibrator 64 is slightly greater than the maximum delay interval. The output of the differentiator 62 is also connected to a gate 65 which is also supplied with the window pulse from the monostable 64 to allow passage of the differentiator 62 output, if the latter is present during the period established by the window pulse, to a lag-advance discriminator 66. In response to a signal from the gate 65 the discriminator 66 interprets it as a condition that the chrominance signal lags with respect to the luminance signal and provides a minus-sign signal to decoders 70 and 71. In the absence of a signal from the gate 65 the discriminator 66 recognizes it as a condition that the chrominance signal advances with respect to the luminance signal and provides a plus-sign signal to the decoders 70, 71.

The counter 67 receives clock pulses at a frequency of 100 MHz from an oscillator 69 to generate a binary coded decimal (BCD) output at periodic interval of 10 nanoseconds when enabled by the output of the flip-flop 63 and feeds the BCD output to the decoder 70. Also generated by the counter 67 is a carry signal which is applied at 10-nanosecond intervals to a decade counter 68 during the time the counter 67 is enabled. The decade counter 68 also provides a BCD output at 100-nanosecond interval to the decoder 71. The counters 67 and 68 are reset to zero in response to the complementary Q ouput of the flip-flop 63 to reinitiate counting operation during subsequent vertical blanking intervals. Each of the decoders 70 and 71 converts the BCD input into corresponding decimal outputs which are respectively coupled to output terminals 54 and 55. The decimal positions of each decoder are arranged in the order of significance which is reversed in response to the minus-sign signal from the lag-advance discriminator 66.

In FIG. 4b, tapped delay line units 80I and 80Q of identical construction are connected to the terminals 52 and 53 to introduce delays into the I and Q signals, respectively. Each tapped delay line unit comprises a 10-nanosecond tapped delay line 81 which provides a range of delays from 10 to 100 nanoseconds with an increment of 10 nanoseconds and a 100-nanosecond tapped delay line 82 which provides a range of from 100- to 1000-nanosecond delays with an increment of 100 nanoseconds. Further included are switching circuits 83 and 84 each having ten input and output leads. The delay lines 81I and 81Q introduce a range of 10- to 100-nanosecond delays to the I and Q signals respectively and present their delayed signals to the switching circuits 83I and 83Q, respectively, over ten output connections. The switching circuits 83I and 83Q are arranged to receive decimal signals respectively from the decoder 70 to selectively connect one of the delayed signals to the 100-nanosecond delay lines 82I and 82Q, respectively, in accordance with the count provided by the 10-nanosecond counter 67. The 100-nanosecond delay lines 82I and 82Q have ten output leads connected to the corresponding terminals of switching circuits 84I and 84Q, respectively. The switching circuits 84I and 84Q are also connected to the decoder 71 to selectively couple one of the delayed signals to output terminals 92 and 93, respectively, in accordance with the count provided by the 100-nanosecond counter 68.

When the luminance and chrominance signals are in phase, these video signals that appear at output terminals 91, 92 and 93 must be in correct phase. Because of the presence of the fixed delay line 34 in the circuit between terminals 41 and 51, each delay line unit 80 is designed to introduce the same amount of delay to the I and Q signals as the amount of delay introduced to the luminance signal when the counts provided by the counters 67 and 68 are zero.

When the chrominance signal lags by "m" nanoseconds with respect to the luminance, the lag-advance discriminator 66 provides a minus-sign signal to the decoders 70 and 71 and the counter 67 is enabled for "m" nanoseconds. This delay interval is translated into decimal signals which operate the switches 83 and 84 so that the I and Q signals are both delayed by "n-m" nanoseconds where "n" represents the delay introduced by the fixed delay line 34.

Conversely, when the chrominance signal advances by "m" nanoseconds with respect to the luminance, a plus-sign signal is applied to the decoders 70, 71 to introduce a delay interval of "n+m" nanoseconds.

In television broadcasting stations, videotaped cassettes are dubbed from one tape to another for editing a new program and during these processes the time base of the recorded video signal tends to deviate from the standard time base as provided by the station equipment.

Figure 5:
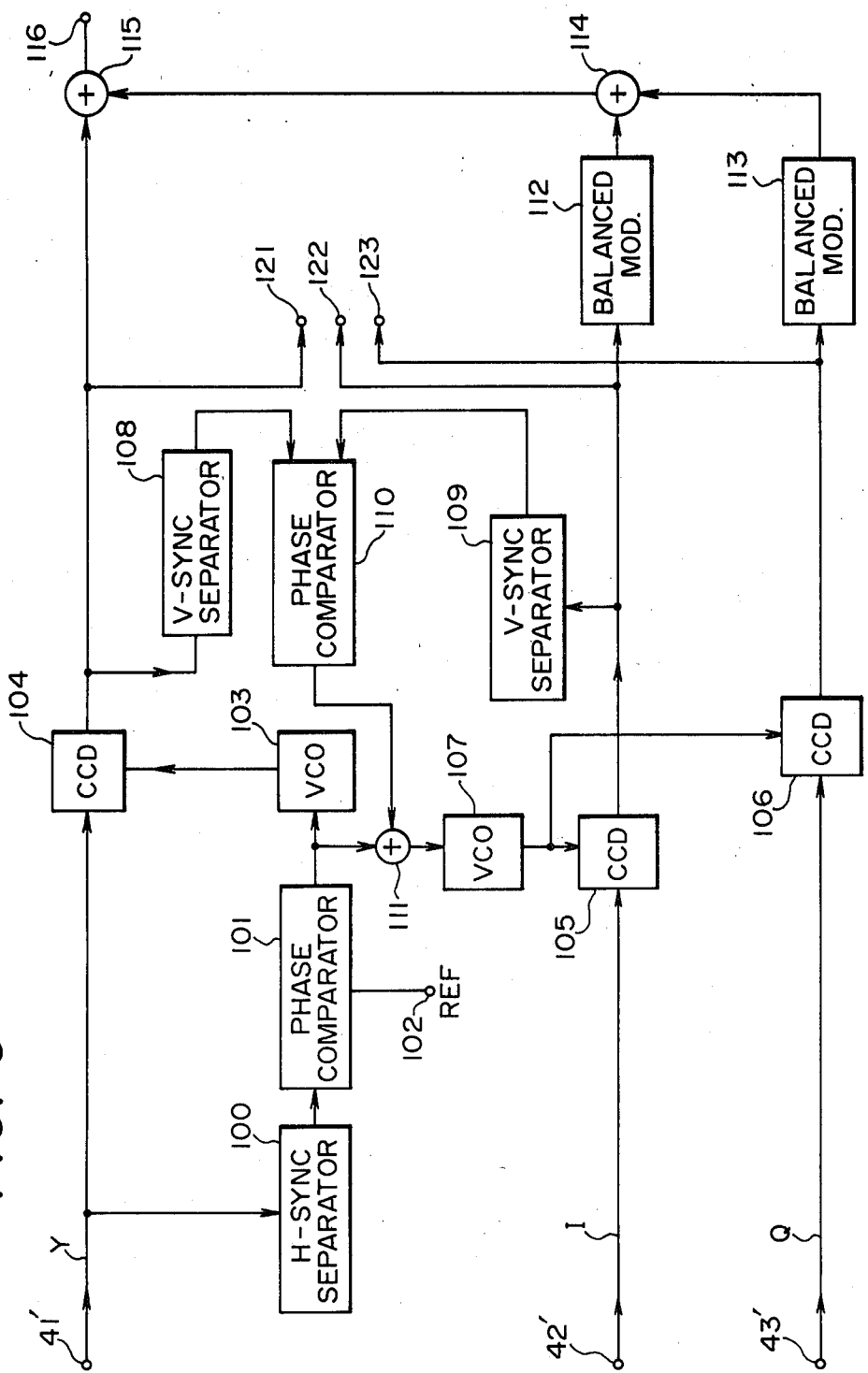
FIG. 5 is an illustration of a block diagram showing part of the system of the invention according to a second embodiment of the invention.

FIG. 5 is an illustration of a second embodiment of the invention which eliminates the time base error. This embodiment forms part of the video tape recording and reproducing system of the invention with the circuit of FIG. 1 and includes input terminals 41', 42' and 43' which are respectively connected to the output terminals 41, 42 and 43 of FIG. 1. The circuit of FIG. 5 comprises a horizontal sync separator 100 which separates a horizontal sync pulse, or time base, from the baseband luminance signal at terminal 41'. The separated time base is compared in phase by a first phase comparator 101 of conventional design with a reference time base supplied to terminal 102 from the broadcasting station equipment or any other appropriate source. If time jitter has introduced into the videotaped material, the separated time base will deviates from the reference phase and the phase comparator 101 generates a phase error voltage signal. This signal is applied to a variable frequency oscillator or voltage controlled oscillator (VCO) 103 which in turns varies its clock frequency. A charge coupled device 104, connected to receive the luminance signal, is clocked by the VCO 103, so that the luminance signal is delayed by a variable interval as a function of the phase difference to compensate for the phase deviation.

To the input terminals 42' and 43' are connected charge coupled devices 105 and 106 respectively which are driven by a VCO 107. Vertical sync separators 108 and 109 are connected to th outputs of the charge coupled devices 104 and 105 respectively to extract vertical sync pulses from the Y and I signals. The extracted vertical sync pulses are fed to a second phase comparator 110 which detects the phase difference between the luminance and chrominance signals and feeds a phase error voltage signal to an adder 111. The adder 111 receives another signal from the first phase comparator 101 to combine it with the error signal from the second phase comparator 110. Thus, the combined phase error voltage represents the amount of total delay to be introduced to the chrominance signal to bring the latter into phase alignment both with respect to the time base and to the luminance signal. The combined phase error signal is applied to the VCO 107 to clock the charge coupled devices 105 and 106 to introduce the delay interval just described to the I and Q signals. The phase compensated Y, I and Q signals appear at terminals 121, 122 and 123, respectively, which may be further connected to another video tape recorder for transferring the recorded signal to another video cassette.

A composite color video signal may be obtained at an output terminal 116 by modulating the phase compensated I and Q signals by double balanced modulators 112 and 113 with zero-degree and 90-degree reference color subcarriers respectively and combining the modulated I and Q signals and the baseband luminance signal by adders 114 and 115.

It is appreciated from the foregoing that, since luminance and chrominance signals are recorded in separate tracks and phase-compensated with respect to each other, the reproduced image is sharply defined and free from deviations in hue and color saturation.

What is claimed is:

1. A color video tape recording and reproducing system comprising:
    means including first and second video transducer heads for separately recording first and second signals of a color video signal with a timing signal interleaved with each of said first and second signals in alternate tracks of a recording medium and reproducing the recorded first and second signals and the recorded timing signals from said recording medium;
    means for separating said timing signals from said reproduced first and second signals;
    means for detecting a phase difference between said separated timing signals; and
    means for delaying one of said reproduced signals relative to the other as a function of said detected phase difference to provide phase alignment between said reproduced signals.

2. A color video tape recording and reproducing system as claimed in claim 1, wherein said second signal is a chrominance signal including I and Q signals, further comprising means for frequency-division multiplexing said I and Q signals to record the multiplexed I and Q signals through said second transducer head in a common recording track.

3. A color video tape recording and reproducing system as claimed in claim 1, further comprising second means for detecting a second phase difference between said first signal and a reference phase to cause said delaying means to additionally introduce a delay interval as a function of said second phase difference to said first and second signals.

4. A color video tape recording and reproducing system as claimed in claim 3, wherein said second phase detecting means comprises means for comparing a time base of said first signal with a reference time base to detect a phase deviation of said first signal with respect to said reference phase at horizontal scan intervals.

5. A color video tape recording and reproducing system as claimed in claim 1, 3 or 4, wherein each of said timing signals separated by said separating means occurs during a vertical blanking interval.

6. A color video tape recording and reproducing system as claimed in claim 1, wherein said delaying means comprises:
    counter means arranged to be enabled for a period as a function of said detected phase difference for counting clock pulses; and
    a tapped delay line for introducing a delay interval to said first signal as a function of the count provided by said counter means.

7. A color video tape recording and reproducing system as claimed in claim 6, wherein said counter means comprises a first counter stage for counting said clock pulses and a second counter stage for counting the output of said first counter stage, and wherein said tapped delay line comprises a first tapped section for delaying said first signal at a smaller incremental delay in response to the count provided by said first counter stage and a second tapped section for delaying said first signal at a larger incremental delay in response to the count provided by said second counter stage.

8. A color video tape recording and reproducing system as claimed in claim 1, 6 or 7, further comprising a fixed delay element for introducing a fixed value of delay to said first signal, and wherein said phase detecting means comprises means for detecting whether said second signal is advancing or lagging with respect to said first signal to cause said delaying means to introduce a delay interval smaller or greater than said fixed value to said second signal.

9. A color video tape recording and reproducing system as claimed in claim 1 or 2, wherein said delaying means comprises:
    a charge coupled device connected to receive said second signal; and
    a variable frequency oscillator responsive to said first phase difference to drive said charge coupled device at a rate variable as a function of the phase difference between said first and second signals.

10. A color video tape recording and reproducing system as claimed in claim 3, 4 or 5, wherein said delaying means comprises:
    first and second charge coupled devices respectively connected to receive said first and second signals;
    a first variable frequency oscillator responsive to said first phase difference to drive said first charge coupled device; and
    a second variable frequency oscillator responsive to a combined value of said first and second phase differences to drive said second charge coupled device at a variable rate as a function of said combined value to compensate for the phase difference between said first and second signals and the phase difference between said first signal and said reference phase.

11. A color video tape recording and reproducing system as claimed in claim 3, 4 or 5, further comprising means for modulating a color subcarrier with said second signal and means for combining said modulated subcarrier with said first signal to generate a composite video signal.

* * * * *